United States Patent
Ohlsson et al.

(10) Patent No.: US 10,575,364 B2
(45) Date of Patent: Feb. 25, 2020

(54) RADIO ACCESS NETWORK NODE AND METHOD PERFORMED THEREIN

(71) Applicant: Telefonaktiebolaget LM Ericsson (publ), Stockholm (SE)

(72) Inventors: Anders Ohlsson, Järfälla (SE); Christer Gustafsson, Huddinge (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 95 days.

(21) Appl. No.: 15/505,658

(22) PCT Filed: Dec. 19, 2014

(86) PCT No.: PCT/SE2014/051540
§ 371 (c)(1),
(2) Date: Feb. 22, 2017

(87) PCT Pub. No.: WO2016/099358
PCT Pub. Date: Jun. 23, 2016

(65) Prior Publication Data
US 2017/0251519 A1    Aug. 31, 2017

(51) Int. Cl.
*H04W 76/28* (2018.01)
*H04W 72/12* (2009.01)
*H04L 5/14* (2006.01)
*H04W 4/06* (2009.01)

(52) U.S. Cl.
CPC ....... *H04W 76/28* (2018.02); *H04W 72/1284* (2013.01); *H04W 72/1289* (2013.01); *H04L 5/14* (2013.01); *H04W 4/06* (2013.01)

(58) Field of Classification Search
CPC ......... H04W 72/1284; H04W 72/1289; H04W 76/28
See application file for complete search history.

(56) References Cited

U.S. PATENT DOCUMENTS

| | | | |
|---|---|---|---|
| 2005/0066034 A1* | 3/2005 | Beckmann | H04W 72/005 709/226 |
| 2008/0132230 A1* | 6/2008 | Marinier | H04W 48/08 455/434 |
| 2013/0045770 A1* | 2/2013 | Aschan | H04W 52/0216 455/522 |
| 2014/0071860 A1* | 3/2014 | Susitaival | H04W 52/0216 370/280 |
| 2014/0254538 A1 | 9/2014 | Park et al. | |
| 2016/0174280 A1* | 6/2016 | Singh | H04W 76/15 370/329 |

OTHER PUBLICATIONS

Liang et al. "An Energy-Efficient Sleep Scheduling With QoS Consideration in 3GPP LTE-Advanced Networks for Internet of Things"; IEEE Journal on Emerging and Selected Topics in Circuits and Systems; Mar. 2013; pp. 13-22; vol. 3, No. 1; Piscataway, NJ.

* cited by examiner

*Primary Examiner* — Rhonda L Murphy
(74) *Attorney, Agent, or Firm* — Coats & Bennett, PLLC

(57) ABSTRACT

A method performed in a radio access network node (12) for enabling communication between a wireless device (10) and the radio access network node (12) serving a cell (11) in a wireless communication network (1). The radio access network node (12) sets a discontinuous reception, DRX, configuration for the wireless device (10) taking an Uplink or Downlink scheduling availability for the wireless device (10) in the cell (11) into account.

16 Claims, 10 Drawing Sheets

RADIO ACCESS NETWORK NODE AND METHOD PERFORMED THEREIN

TECHNICAL FIELD

Embodiments herein relate to a radio access network node and a method performed therein. In particular, embodiments herein relate to enabling communication between a wireless device and the radio access network node.

BACKGROUND

In a typical wireless communication network, wireless devices, also known as mobile stations and/or user equipments (UEs), communicate via a Radio Access Network (RAN) to one or more core networks. The RAN covers a geographical area which is divided into cell areas, with each cell area being served by a base station, e.g., a radio base station (RBS), which in some networks may also be called, for example, a "NodeB" or "eNodeB" (eNB). A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole wireless communication network is also broadcasted in the cell. One base station may have one or more cells. The base stations communicate over the air interface operating on radio frequencies with the wireless devices within range of the base stations.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for wireless devices. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base stations are directly connected to the EPC core network rather than to RNCs. In general, in E-UTRAN/LTE the functions of a RNC are distributed between the radio base stations, e.g. eNodeBs (eNB) in LTE, and the core network. As such, the RAN of an EPS has an essentially "flat" architecture comprising radio base stations without reporting to RNCs.

DRX

Discontinuous reception (DRX) reduces battery consumption in the wireless device by limiting the time when receptions need to be monitored. The wireless device can only be scheduled in DL when the wireless device monitors the Physical Downlink Control Channel (PDCCH). This implies that the wireless device can only be scheduled during a fraction of the time, during very specific periods of time when the wireless device is wake, called wake periods defined by an On_Duration_Timer, as shown in FIG. 1. Also an inactivity timer is used before going back to dose/inactivity state after receiving data in a wake period. The short wake periods, or actually the inactivity, sleep, periods of Long_DRX_cycles, reduce the amount of time the wireless device monitors the PDCCH reducing the battery consumption of the wireless device.

It is advantageous to spread the wake periods over time of the wireless devices in order to spread a load, e.g. served wireless devices, due to scheduling in time. This means that the radio access network node attempts to configure the DRX for wireless devices so that different wireless devices do not have simultaneous wake time or wake periods.

However, the performance of the wireless communication network may be reduced when being in DRX mode delaying or failing communication.

SUMMARY

It is therefore an object of embodiments herein to provide a mechanism that improves the performance of the wireless communication network.

According to an aspect the object is achieved by providing a method performed in a radio access network node for enabling communication between a wireless device and the radio access network node serving a cell in a wireless communication network. The radio access network node sets a discontinuous reception, DRX, configuration for the wireless device taking an Uplink or Downlink scheduling availability for the wireless device in the cell into account.

According to another aspect the object is achieved by providing a radio access network node for enabling communication between a wireless device and the radio access network node serving a cell in a wireless communication network. The radio access network node is configured to set a DRX configuration for the wireless device taking an Uplink or Downlink scheduling availability for the wireless device in the cell into account.

Embodiments herein enable communication between the wireless device and the radio access network node in the wireless communication network since the wireless device will be able to detect the UL/DL scheduling grants or assignments as the set DRX configuration is based the availability of UL/DL scheduling. This leads to an improved performance of the wireless communication network.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
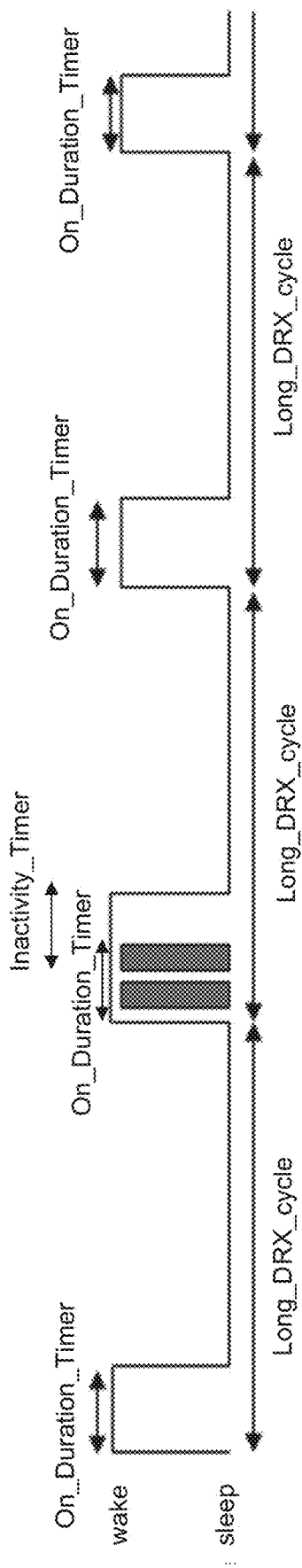
FIG. 1 is a schematic overview depicting a DRX cycle.

The figures are schematic and simplified for clarity, and they merely show details which are essential to the understanding of the embodiments presented herein, while other details have been left out. Throughout the disclosure, the same reference numerals are used for identical or corresponding parts or actions.

As part of developing embodiments herein a problem has been identified and is described below.

Scheduling Request (SR) Suppression

DRX can be used together with Voice over LTE (VoLTE) to reduce the battery consumption in a wireless device during calls. It is easy to come up with an effective DRX configuration for a VoLTE service because the packet generation in a VoLTE service is very predictable. But when applying a scheduling algorithm on the VoLTE service, which scheduling algorithm bundles the VoLTE packets two and two, a problem may occur in the uplink. The reason is that the wireless device will send an SR each time the wireless device wants to send a VoLTE packet in the UL, i.e. every 20 ms. But if the radio base station wants to bundle the packets two by two, the radio base station will wait 40 ms to schedule the wireless device. This means that the wireless device will be awake waiting for UL grant already after 20 ms until it receives the UL grant. This greatly increases battery consumption in the wireless device as the wireless device is awake unnecessary when not receiving the grant.

To avoid this issue, SR suppression may be used. SR suppression tells the wireless device that the wireless device cannot send an SR if the wireless device wants to send data on a specific logical channel. SR suppression, or 'logicalChannelSR-Mask-r9' as it is called in the 3GPP standard, is configured via the Radio Resource Control (RRC) protocol and supported in 3GPP Release 9 and later.

LTE TDD

Time-Division Duplex (TDD) LTE, abbreviated as TD-LTE, TDD LTE, or LTE TDD is one of the two mobile data transmission technologies that fall under the international standard of LTE, the other being LTE Frequency-Division Duplex (FDD). LTE TDD was developed specifically with idea of migration to 4G from the third generation 3G Time Division-Synchronous Code Division Multiple Access (TD-SCDMA) networks in mind.

There are two major differences between LTE TDD and LTE FDD: how data is uploaded and downloaded, and what frequency spectra the networks are deployed in. While LTE FDD uses paired frequencies to upload and download data, LTE TDD uses a single frequency, alternating between uploading and downloading data through time. The ratio between resources for uploads and downloads on a LTE TDD network may be changed dynamically, depending on whether more data needs to be sent or received.

Downlink and uplink transmissions are organized into radio frames with 10 ms duration. Two radio frame structures are supported:

Frame structure Type 1, applicable to LTE FDD;
Frame structure Type 2, applicable to LTE TDD.

Figure 2:
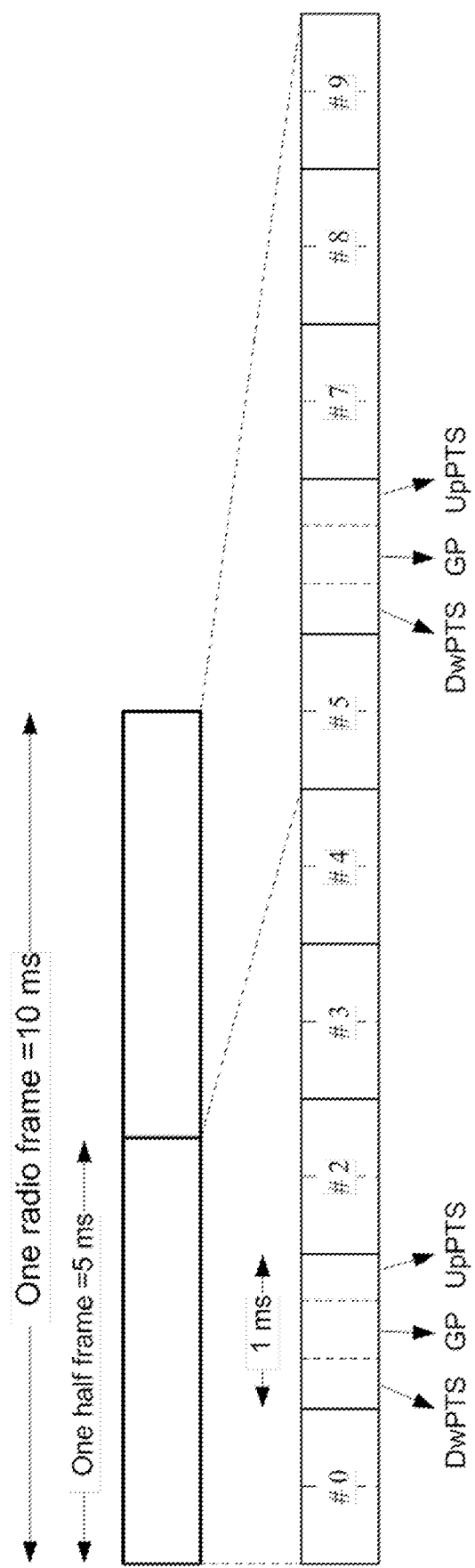
FIG. 2 is a schematic overview depicting a TDD frame configuration.

Frame structure Type 2 is illustrated in FIG. 2. Each 10 ms radio frame comprises two half-frames of 5 ms each. Each half-frame comprises eight slots of length 0.5 ms and three special fields: Downlink Pilot Time Slot (DwPTS), Guard Period (GP) and Uplink Pilot Time Slot (UpPTS). The length of DwPTS and UpPTS are configurable limited by the total length of the DwPTS, the GP and the UpPTS being equal to 1 ms. Both 5 ms and 10 ms switch-point periodicity are supported. Subframe '1' in all configurations and subframe '6' in configuration with 5 ms switch-point periodicity consist of DwPTS, GP and UpPTS. Subframe '6' in configuration with 10 ms switch-point periodicity comprises DwPTS only. All other subframes consist of two equally sized slots.

For TDD, GP is reserved for downlink to uplink transition. Other Subframes/Fields are assigned for either downlink or uplink transmission. Uplink and downlink transmissions are separated in the time domain. Different configurations of the TDD frame configuration is defined in Table 1, the configurations are set by an operator.

TABLE 1

| Uplink-downlink allocations | | | | | | | | | | | |
|---|---|---|---|---|---|---|---|---|---|---|---|
| Config- | Switch-point | Subframe number | | | | | | | | | |
| uration | periodicity | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

VoLTE

In LTE all packets are delivered using the Internet Packet (IP) protocol. This means that also traditionally circuit switched services such as voice conversation will make use of fast scheduling and is called Voice over IP (VoIP). In a typical VoIP arrangement a voice encoder on the transmitter side encodes the speech into packets with a typical speech duration of 20 ms. Voice over LTE (VoLTE) enables LTE networks to provide voice services. The mouth-to-ear delay introduced by the transport scheduling and transmission of the VoLTE packets is one of the main factors determining the experienced speech quality. This causes a relatively tight delay budget for VoLTE to ensure good speech quality. The normal delay budget in an eNB is 80 ms. Up to the limit of the delay budget the speech quality is good. This means that in general it is sufficient to schedule a VoLTE service once every 40 ms, bundling two packets together. Such a scheduling method allows for a good balance between efficient resource usage and sufficient speech quality.

Figure 3:
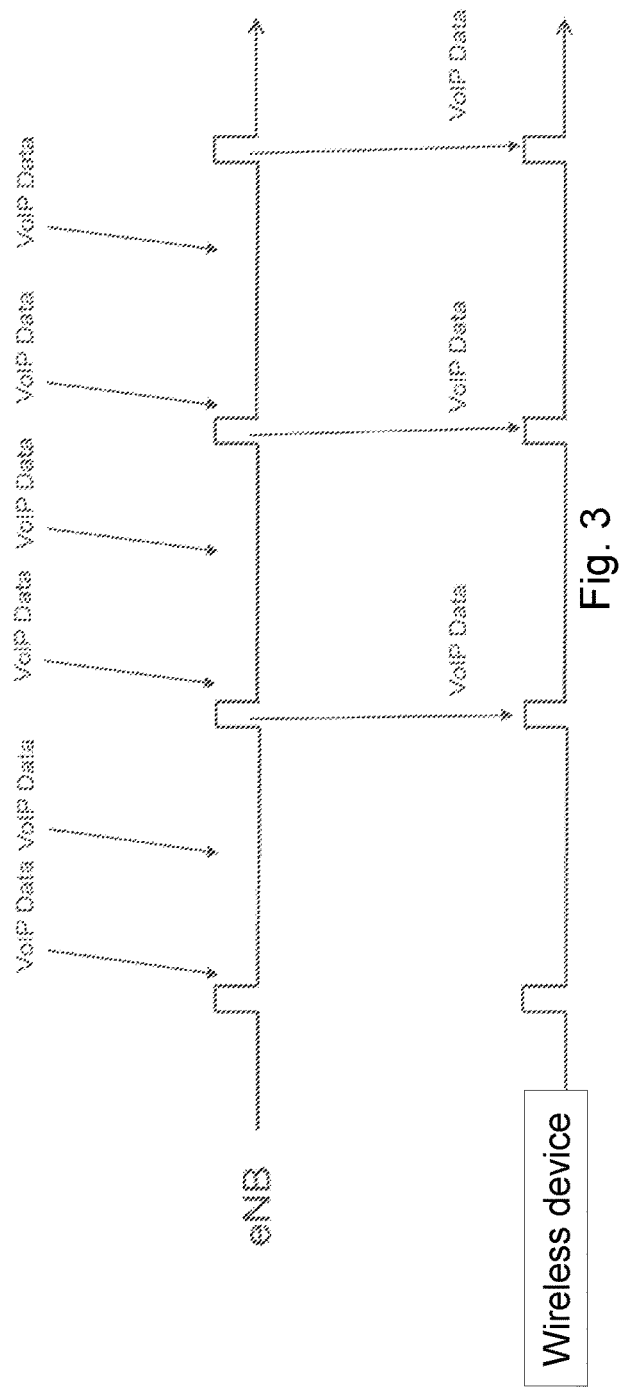
FIG. 3 is a schematic overview depicting VoLTE scheduling in DL when DRX is configured.
Figure 4:
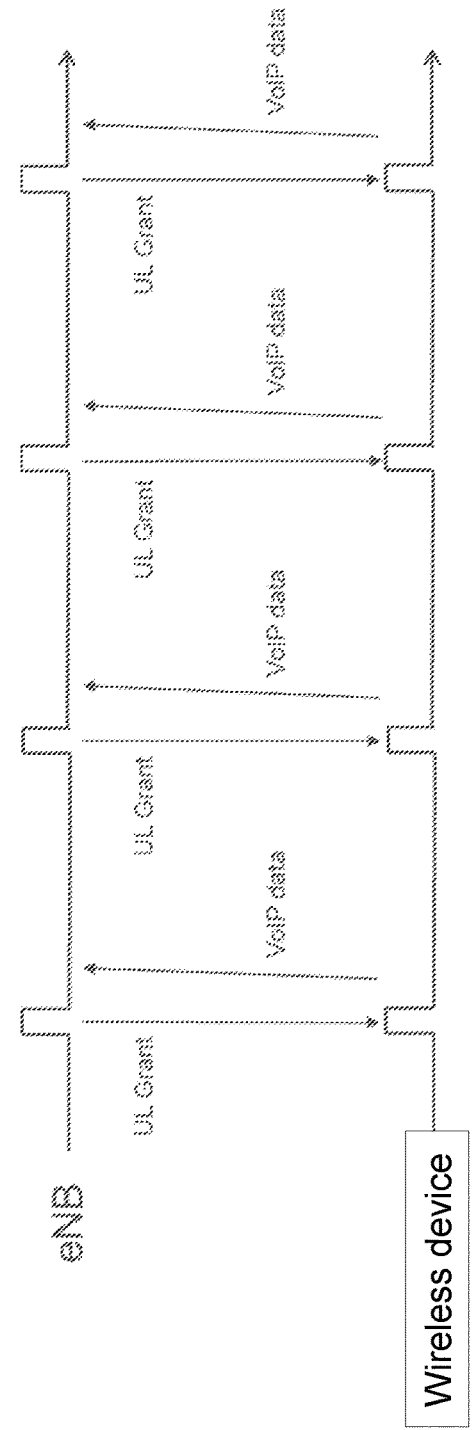
FIG. 4 is a schematic overview depicting VoLTE scheduling in UL when DRX and SR suppression are configured.

When DRX, configured for good battery performance in the wireless device, is combined with VoLTE the wireless device is configured to monitor the PDCCH during one or more subframes with a 40 ms period. Since speech packets are produced once every 20 ms this DRX configuration allows for transmission of two speech packets every 40 ms, see FIGS. 3 and 4. FIG. 3 shows an example of VoLTE scheduling in downlink when DRX is configured. DL assignments are transmitted before the VoIP data packets and in FIG. 3 it is shown that the VoIP data packets are sent 2-by-2, bundled, due to the 40 ms DRX cycle. A voice packet arrives every 20 ms. FIG. 4 shows an example of VoLTE scheduling in uplink when DRX and SR suppression is configured. An UL grant is received at the wireless device when the device is being awake and then VoIP data is transmitted to the eNB. An advantage of a configuration like this is that two packets are scheduled per scheduling opportunity, allowing efficient use of PDCCH and other scheduling resources, while the scheduling delay is still less than the delay budget. However, the tight delay budget of VoLTE does require that the wake period is utilized for scheduling of the VoIP packets that are available. If the opportunity is missed, an additional delay of 40 ms is reducing the possibility to transmit the packets within the delay budget.

Hence, the risk of missing a scheduling subframe when using DRX is increased when running a TDD system with VoLTE, DRX and SR suppression, as available subframes for UL transmission of VoIP packets are reduced by both the TDD subframe configuration and DRX. Since both DRX and TDD reduce the available subframes where the wireless device can be scheduled in UL, a combination of these features can reduce the possible subframes to zero subframes. This problem will reduce the VoLTE performance even when only a small number of VoLTE wireless devices is present in the cell, i.e. it is a problem that is not only occurring at high load. If a wake period is occurring simultaneous, completely or partly, as the UL subframes of a TDD frame configuration, the opportunity for scheduling in UL is reduced, completely or partly, as the UL scheduling is transmitted in DL subframes. The problem is particular sever for Frame structure Type 2 configurations 2, 4 and 5. In these configurations there are only 1-2 UL subframes available. This will lead to a reduced performance of the wireless communication network using a voice over IP service. These type of problem also occur in similar systems where scheduling opportunities are limited, e.g. Multimedia Broadcast Multicast Service where a number of subframes may be reserved and already allocated.

Figure 5:
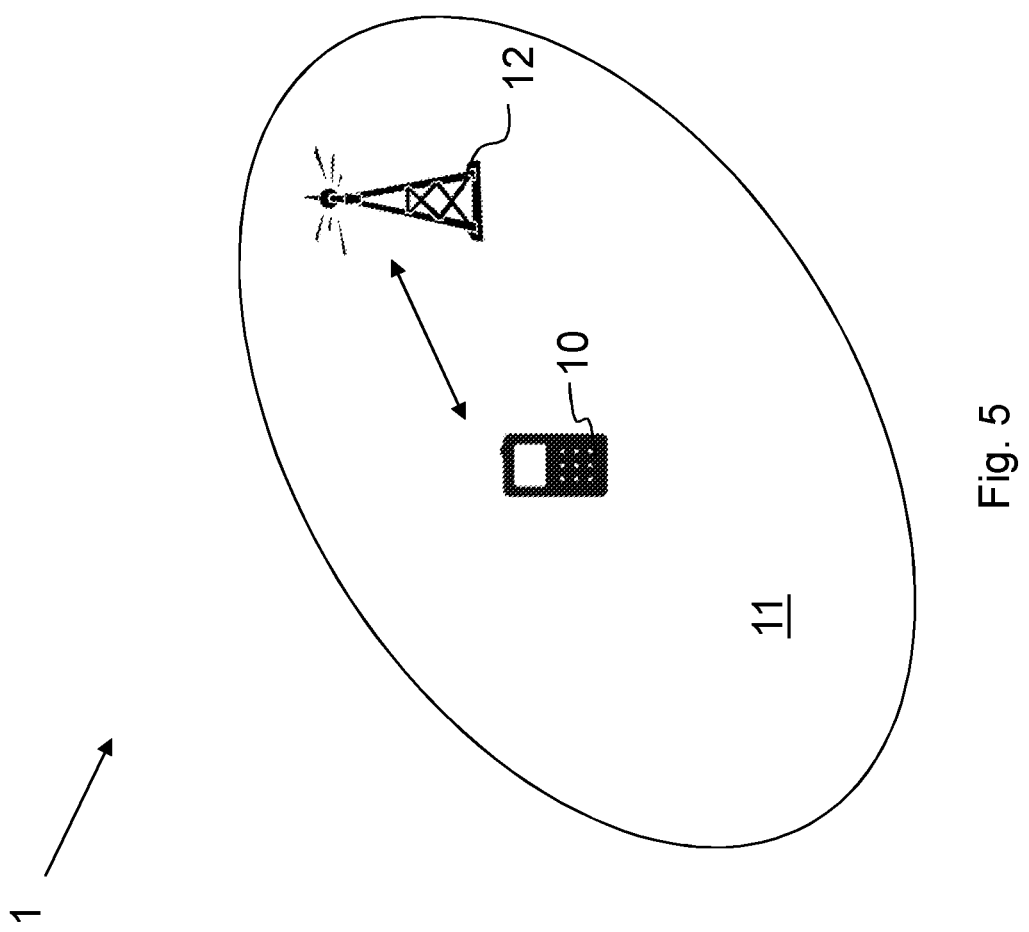
FIG. 5 is a schematic overview depicting a wireless communication network according to embodiments herein.

Embodiments herein relate to wireless communication networks in general. FIG. 5 is a schematic overview depicting a wireless communication network 1. The wireless communication network 1 comprises one or more RANs and one or more CNs. The wireless communication network 1 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The wireless communication network 1 is exemplified herein as an LTE network.

In the wireless communication network 1, a wireless device 10, also known as a mobile station, a user equipment and/or a wireless terminal, communicates via a RAN to one or more CNs. It should be understood by the skilled in the art that "wireless device" is a non-limiting term which means any wireless terminal, user equipment, Machine Type Communication (MTC) device, a Device to Device (D2D) terminal, or node e.g. Personal Digital Assistant (PDA), laptop, mobile phone, sensor, relay, mobile tablets or even a small base station communicating within respective cell.

The wireless communication network 1 covers a geographical area which is divided into cell areas, e.g. a cell 11 being served by a radio access network node 12. The radio access network node 12 may also be referred to as a radio base station such as a NodeB, an evolved Node B (eNB, eNode B), a base transceiver station, Access Point Base Station, base station router, or any other network unit capable of communicating with a wireless device within the cell 11 served by the radio access network node depending e.g. on the radio access technology and terminology used. The radio access network node 12 may serve one or more cells, such as the cell 11.

A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 11 uniquely in the whole wireless communication network 1 is also broadcasted in the cell 11. The radio access network node 12 communicates over the air or radio interface operating on radio frequencies with the wireless device 10 within range of the radio access network node 12. The wireless device 10 transmits data over the radio interface to the radio access network node 12 in Uplink (UL) transmissions and the radio access network node 12 transmits data over an air or radio interface to the wireless device 10 in Downlink (DL) transmissions.

During certain circumstances the risk of missing a scheduling opportunity is even more enlarged. E.g. if a Voice over LTE (VoLTE) call is setup in a LTE TDD system that utilizes DRX and scheduling request (SR) suppression, the VoLTE performance may be reduced due to a combination of DRX configuration and TDD frame configuration not providing any of very few UL scheduling opportunities, but according to embodiments herein the radio access network node 12 sets/selects a DRX configuration that avoids such performance reduction. The radio access network node 12 sets, according to embodiments herein, a discontinuous reception, DRX, configuration for the wireless device 10 taking an Uplink or Downlink scheduling availability for the wireless device 10 in the cell 11 into account. Thereby enabling communication between the wireless device 10 and the radio access network node 12 in the wireless communication network 1 since the wireless device 10 will be able to detect the UL/DL scheduling grants or assignments.

According to embodiments herein the radio access network node 12 sets DRX configuration based on availability of UL/DL scheduling opportunities. The method actions in the radio access network node 12, e.g. an eNB or a radio base station, for enabling communication between the wireless device 10 and the radio access network node 12 serving the cell 11 in the wireless communication network 1 according to some embodiments will now be described with reference to a flowchart depicted in FIG. 6. The actions do not have to be taken in the order stated below, but may be taken in any suitable order. Actions performed in some embodiments are marked with dashed boxes.

Action 601. The radio access network node 12 may determine a number of uplink or downlink scheduling opportunities for the wireless device 10. This is done in order to determine availability of Uplink or Downlink scheduling. E.g. the radio access network node 12 may determine number from a TDD frame configuration used, see Table 1 above.

Action 602. The radio access network node 12 sets a DRX configuration for the wireless device 10 taking an Uplink or Downlink scheduling availability for the wireless device 10 in the cell 11 into account. The set DRX configuration may comprise a wake period for the wireless device 10 overlapping a subframe for scheduling uplink or downlink resources for the wireless device 10. The radio access network node 12 may set the DRX configuration by offsetting the DRX configuration adjusted in time for the wake period to overlap the subframe for scheduling uplink or downlink resources for the wireless device 10. The set DRX configuration may comprise a prolonged wake period of the DRX configuration. The radio access network node 12 may set the DRX configuration by disabling the DRX configuration for the wireless device 10 or by setting a DRX configuration with a wake period extending over a DRX cycle. In some embodiments the radio access network node 12 may set the DRX configuration based on the determined number of uplink or downlink scheduling opportunities. These different setting may be performed separately or combined. E.g. the radio access network node 12 may set the DRX configuration by first offsetting the DRX configuration adjusted in time for the wake period to overlap the subframe for scheduling uplink or downlink resources for the wireless device 10. Then, based on a load in the cell 11, the radio access network node 12 may adjust the wake period of the DRX configuration for the wireless device 10 and/or disable the DRX configuration for the wireless device 10. E.g. when load is high with many served wireless devices the wake period may be increased to enable the wireless device to get a scheduled UL or DL transmission.

The downlink scheduling availability may be based on availability of a Multimedia Broadcast Multicast Service and/or the uplink scheduling availability may be based on an uplink subframe configuration of a Time Division Duplex frame configuration. For example, setting DRX configuration or selecting DRX configuration may be performed by first determining availability by comparing number of uplink scheduling subframes in the time division duplex frame configuration with a threshold, and when the number exceeds the threshold, the radio access network node 12 selects a DRX configuration for optimizing battery performance, and when the number is equal or below the threshold, the radio access network node 12 selects a DRX configuration with an adjusted wake period, in length or initiation in time.

In some embodiments the radio access network node 12 uses scheduling request suppression for Voice over Long Term Evolution for the wireless device 10. Hence, the availability is very limited in these type of system but according to embodiments herein the performance reduction is avoided or at least mitigated.

Action 603. The radio access network node 12 may then transmit the set DRX configuration to the wireless device 10, e.g. via RRC signaling.

Figure 7:
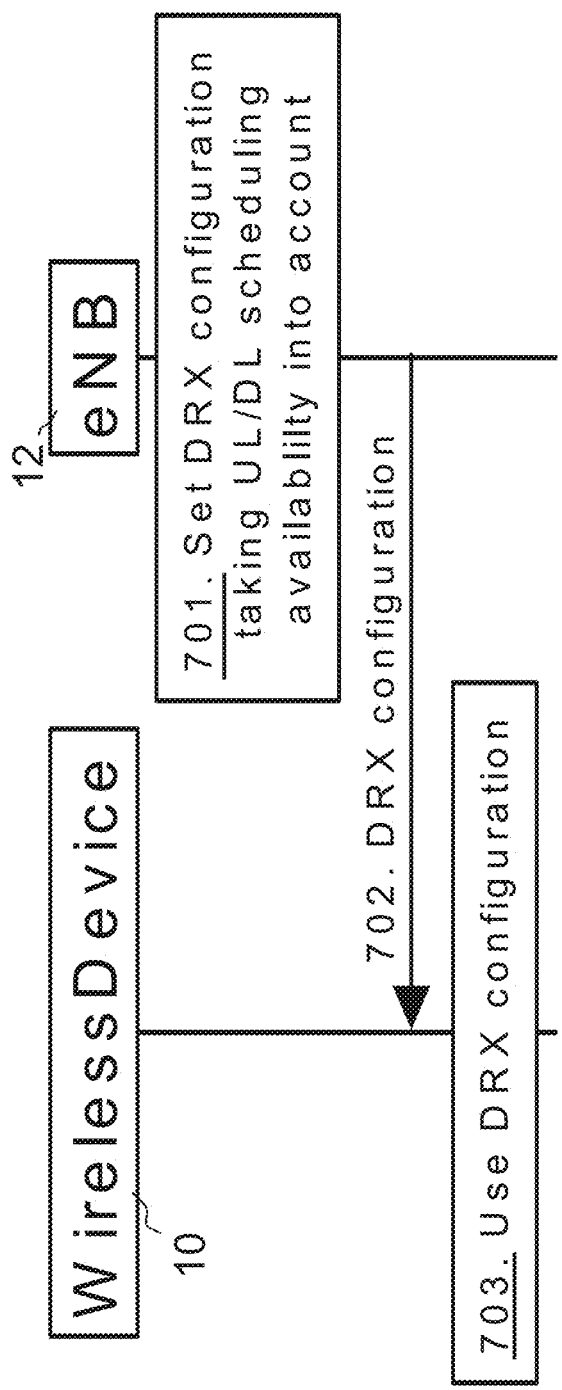
FIG. 7 is a combined flowchart and signaling scheme according to embodiments herein.

FIG. 7 is a combined flowchart and signaling scheme depicting an example of embodiments herein.

Action 701. The radio access network node 12 sets the DRX configuration taking the UL or DL scheduling availability into account. For example, if a wake period of a DRX configuration is occurring simultaneous, completely or partly, as the UL subframes, meaning that the UL scheduling subframe is not within the wake period, a DRX configuration is chosen that increases the wake period or that avoids sleep completely. This may firstly be done by moving the wake period of the DRX configuration, by changing the DRX Offset, not affecting the battery consumption negatively. Secondly this may be done by further configuring an increased onDuration, which might be needed in high capacity scenarios when load is high within the cell 11, and as a third step by disabling DRX for this wireless device 10. This is an example of Action 602 in FIG. 6.

For example, by setting/scheduling DRX, in a TDD frame network, based on the allocation of UL subframes in the TDD frame structure to avoid that the wake periods collide with UL subframes as the scheduling of UL is transmitted in DL subframes, the performance in the wireless communication network 1 is increased as the wireless device 10 will be able detect and receive UL scheduling and not have a reduced number of UL subframes to transmit data in and a reduced UL scheduling availability.

Action 702. The radio access network node 12 transmits the set DRX configuration to the wireless device 10. That is, the wireless device 10 is configured with the set DRX configuration. This corresponds to action 603 in FIG. 6.

Action 703. The wireless device 10 then uses the received DRX configuration transmitted from the radio access network node 12 leading to an improved performance of the wireless communication network as UL/DL scheduling opportunities are not missed.

Figure 8:
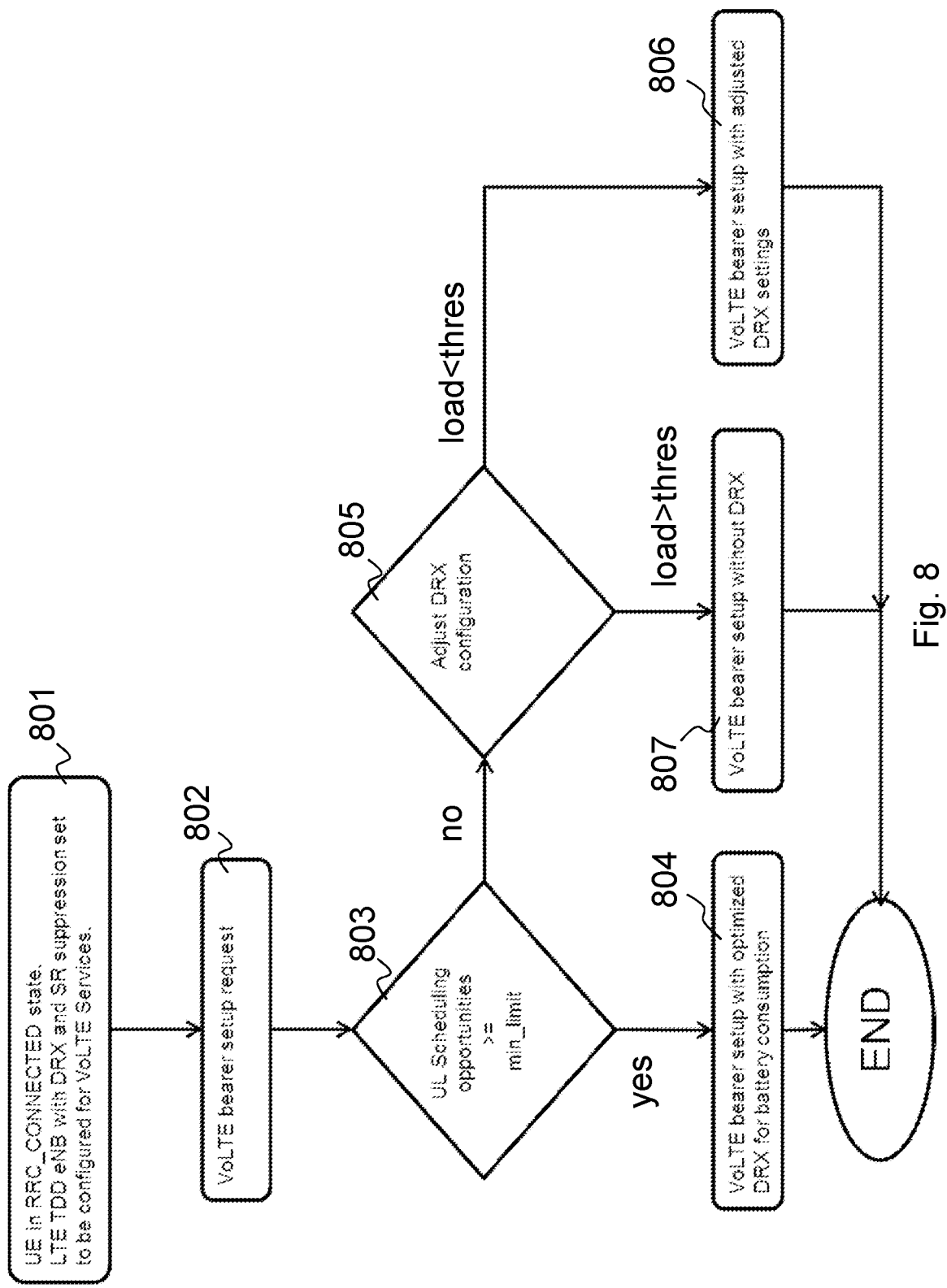
FIG. 8 is a schematic flowchart depicting a method according to some embodiments herein.

FIG. 8 is a flowchart depicting a VoLTE bearer setup implementing embodiments herein. This is exemplified in a LTE TDD communication network when DRX and SR suppression are used for VoLTE services.

Action 801. The wireless device 10 is connected to a LTE TDD eNB, being an example of the radio access network node 12. The wireless device 10 or UE is in an RRC_CONNECTED state. The LTE TDD eNB is configured to use, or configured with, DRX and SR suppression for VoLTE services. Hence, the radio access network node 12 is an LTE TDD eNB with DRX and SR suppression set to be configured for VoLTE Services. Note that the wireless device 10 is not using VoLTE services yet, it has not received a VoLTE bearer.

Action 802. The wireless device 10 sends a VoLTE bearer setup request to the radio access network node 12. The radio access network node 12 is requested to provide VoLTE service to the wireless device 10. A VoLTE bearer is setup. The VoLTE bearer is to be configured in the wireless device 10 by performing an RRC Connected Reconfiguration. The DRX configuration may be changed by the same RRC Connected Reconfiguration since an optimum DRX configuration is service specific.

Action 803. The radio access network node 12 checks the amount of UL scheduling opportunities in wake subframes of the wake period for the wireless device 10. The UL scheduling opportunities are compared to a minimum limit (min_limit) of opportunities. It should be noted that the min_limit of UL scheduling opportunities for the specific LTE TDD frame configuration may differ, because the different TDD frame configurations have different amount of UL subframes, i.e. different amount of UL scheduling opportunities. This is an example of action 601 in FIG. 6.

Action 804. If the amount UL scheduling opportunities is above or equal the min_limit a VoLTE bearer setup is performed with optimized DRX for battery consumption. I.e. the DRX configuration is set to be optimum for battery performance for wireless devices using VoLTE services.

Action 805. If the amount of UL scheduling opportunities is below the min_limit the DRX configuration is adjusted, i.e. the DRX configuration is set taking the UL or DL scheduling availability into account. This is an example of action 602 in FIG. 6.

Action 806. A VoLTE bearer setup is performed with adjusted DRX settings when e.g. load in the cell 11 is below a threshold (thres). The radio access network node 12 may e.g. offset the DRX cycle and/or increase the wake period of the wireless device 10. This is an example of action 602 in FIG. 6.

Action 807. When the load in the cell 11 is above thres, the VoLTE bearer setup may alternatively or additionally be performed without DRX, wherein the wireless device 10 is configured to not have sleep time at all. For example by configuring a DRX inactivity timer of larger than 40 ms, a wireless device 10 using VoLTE services will always be awake. This is an example of action 602 in FIG. 6.

Figure 6:
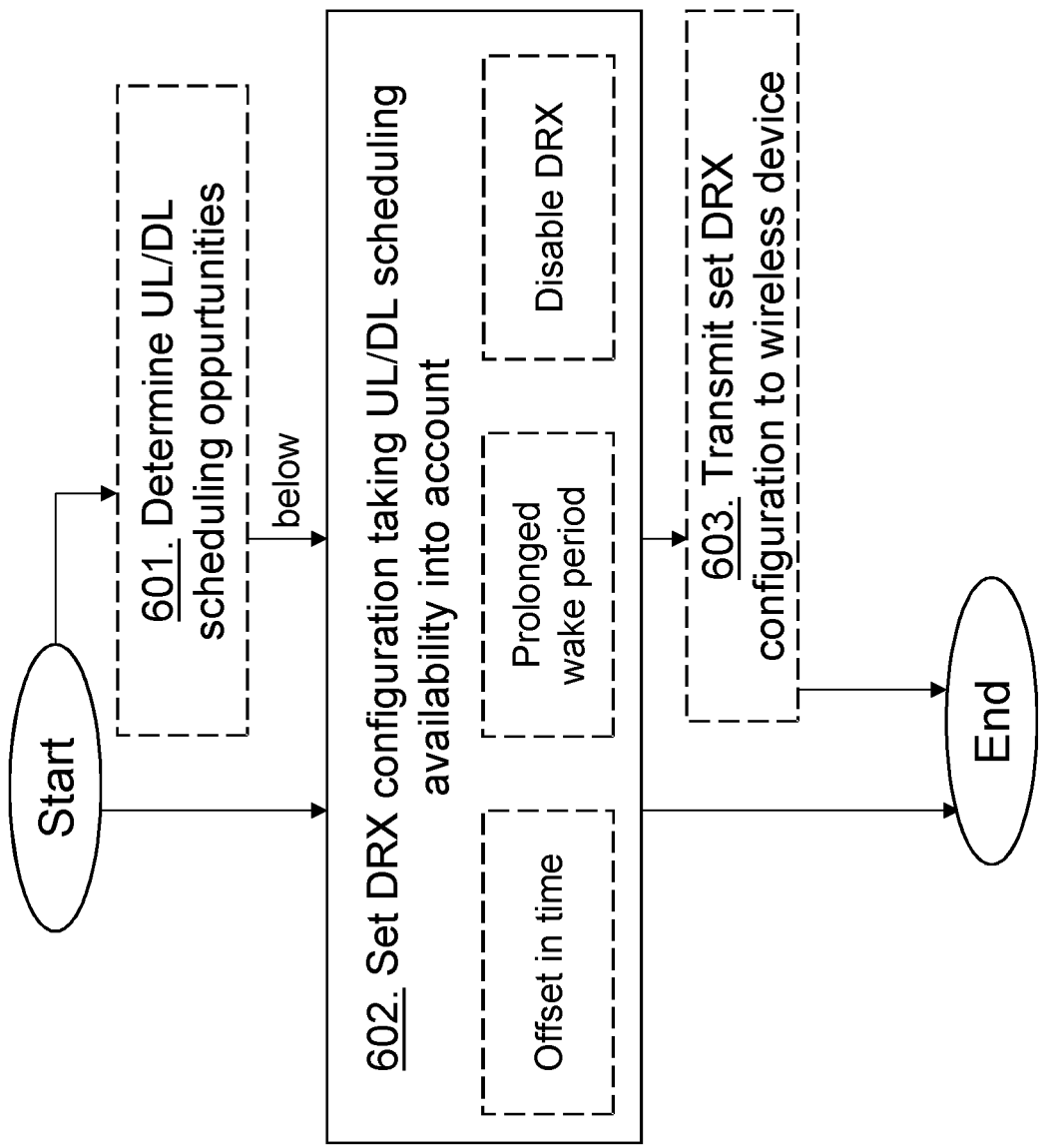
FIG. 6 is a schematic flowchart depicting a method performed in a radio access network node according to embodiments herein.
Figure 9:
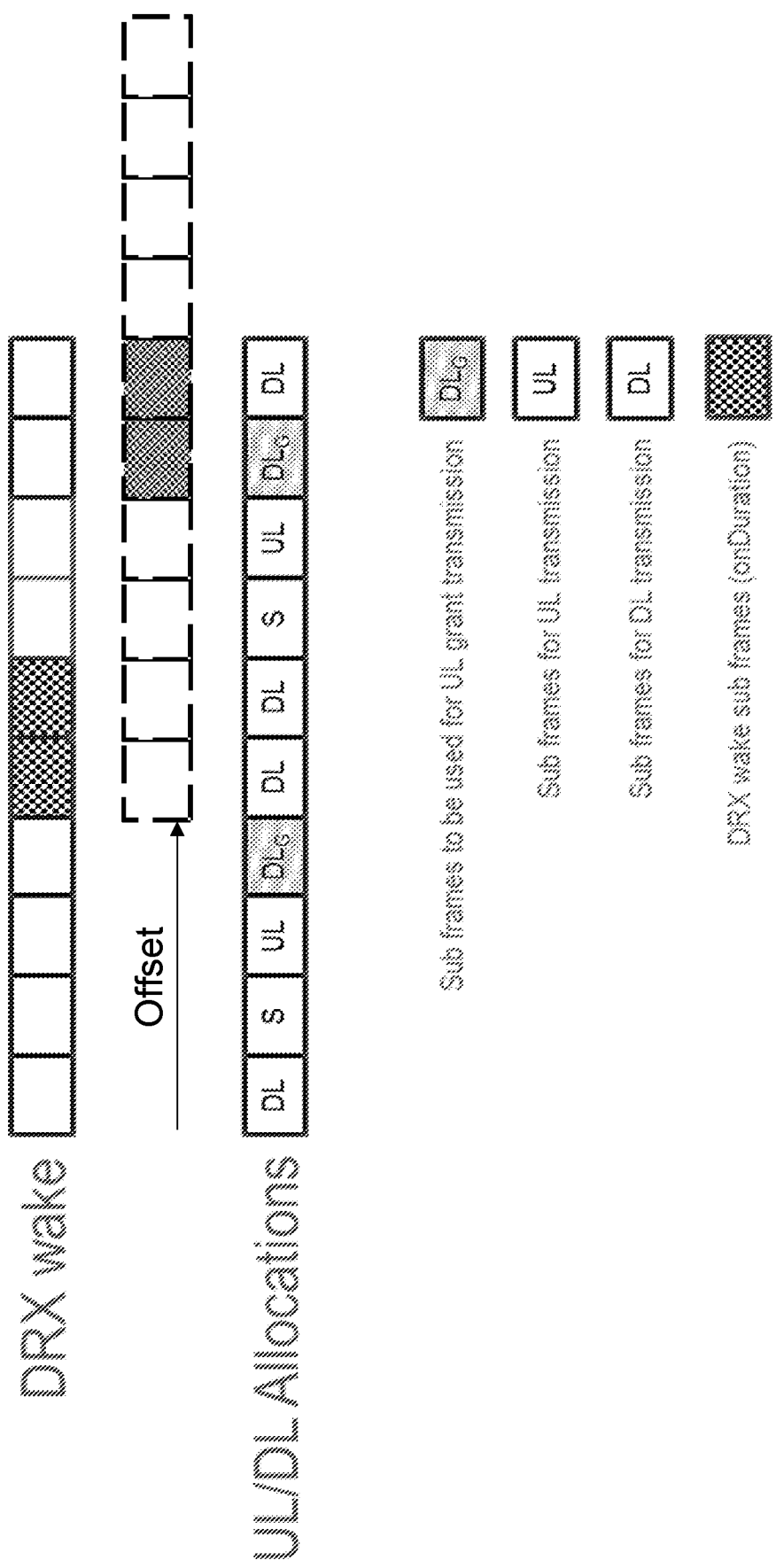
FIG. 9 is an example of a DRX wake period versus UL/DL frame allocations.

The radio access network node 12 may determine the UL scheduling opportunities e.g. when combining "DRX wake" and LTE TDD UL subframes as shown in Action 601 in FIG. 6. The principle is that a minimum amount of UL scheduling opportunities for the wireless device 10 is needed to be able to maintain a delay sensitive service such as VoLTE. The DRX wake periods may be mapped with UL scheduling opportunities given by the LTE TDD frame configuration. This is especially for the configuration 2, 4 and 5, see Table 1, where UL scheduling opportunities are few. This mapping may be done by laying out the DRX wake periods, also referred to as drx-onDurations, on top of the LTE TDD frame configuration used. This is illustrated in FIG. 9 showing an example using LTE TDD frame configuration 2 and a DRX configuration with 4 ms wake period every 40 ms. A DRX wake subframe is a checkered subframe and not sleeping DRX wake subframes are marked as white subframes. In the TDD frame configuration a subframe to be used for UL grant transmission, i.e. UL scheduling, is marked $DL_G$ and grey. UL subframes are marked with UL and DL subframes are marked with DL. Switch point subframes are marked with an s. In this example the wireless device will not have any possible opportunity to receive an UL grant to do a UL transmission in any of the two UL sub frames available. The radio access network node 12 may then offset the DRX configuration for the wireless device 10 as indicated with the dashed frame structure, thereby the wireless device 10 is awake when the UL grant is transmitted. Alternatively or additionally, the radio access network node 12 may increase the wake period e.g. to 5 ms, or decide to not configure DRX at all. It should be noted that the DL subframe carrying UL scheduling is allocated 4 ms before the UL subframe and thus the wake period should include at least one DL subframe 4 ms before a UL subframe in order for the wireless device 10 to receive the UL grant in time to do the UL transmission in the UL sub frame. It should be noted that the onduration timer is measured in PDCCH subframes, i.e. only the DL subframes are counted for the onduration.

Figure 10:
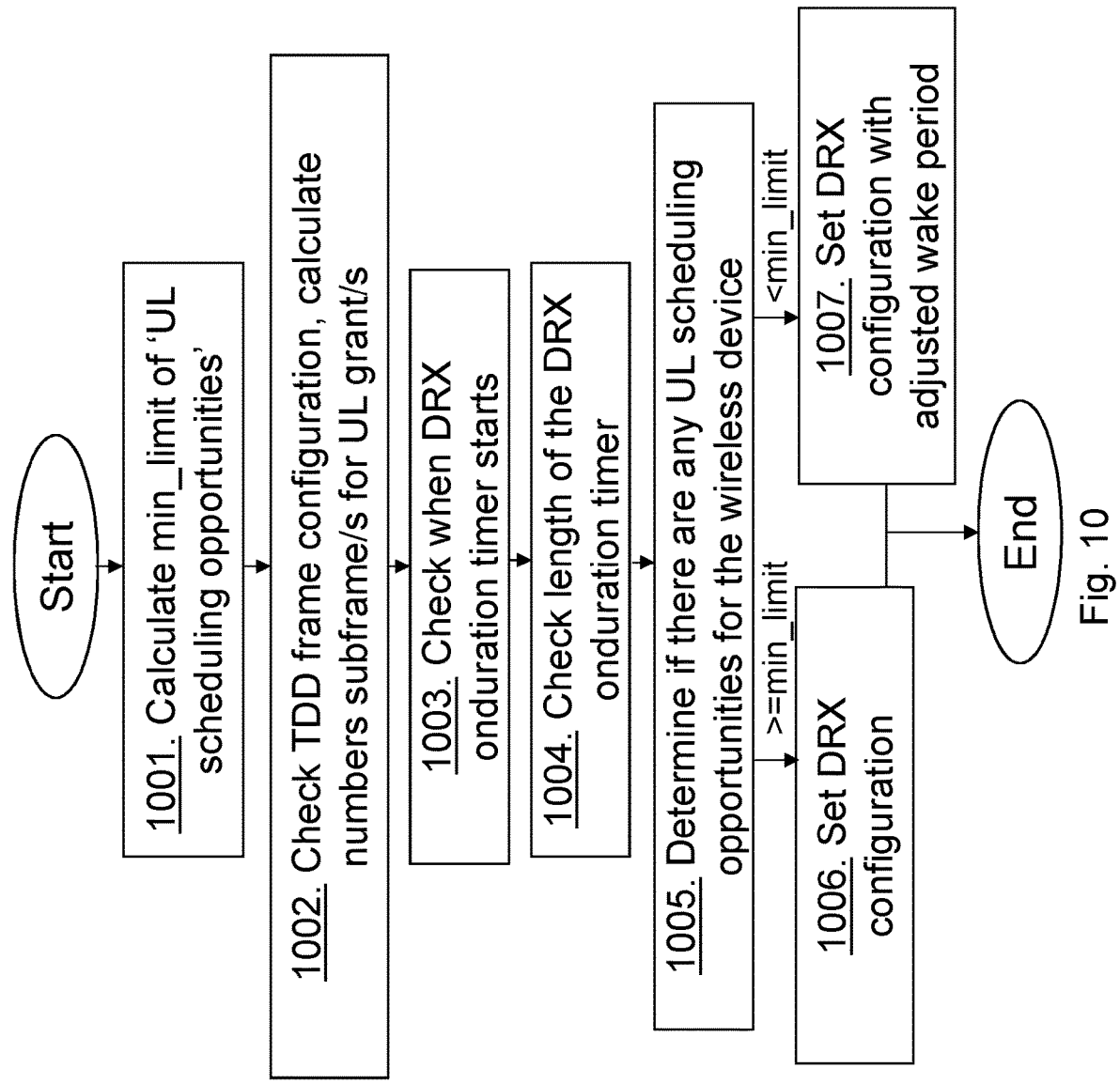
FIG. 10 is a schematic flowchart depicting a method performed in a radio access network node according to some embodiments herein.

FIG. 10 shows an example of a typical method to set DRX configuration based on UL scheduling opportunities in a TDD system.

Action 1001. The radio access network node 12 may calculate the min_limit of UL scheduling opportunities based on a current resource usage in the cell 11.

Action 1002. The radio access network node 12 may then check the TDD frame configuration and calculate numbers of DL subframe/s used to transmit the UL grant/s.

Action 1003. The radio access network node 12 may check when a DRX onduration timer starts in the radio frame see FIG. 9 above. This is determined from the DRX Offset.

Action 1004. The radio access network node 12 may check length of the DRX onduration timer.

Action 1005. The radio access network node 12 may, from actions 1001, 1002, 1003 and 1004, determine if there are any or number of UL scheduling opportunities for the wireless device 10. This is an example of action 601 in FIG. 6.

Action 1006. The radio access network node 12 may, if the amount of UL scheduling opportunities for the wireless device 10 is acceptable i.e. equal or above min_limit, set a DRX configuration where the DRX configuration is optimized for battery performance for VoLTE services.

Action 1007. However, if the amount of UL scheduling opportunities for the wireless device 10 is NOT acceptable i.e. below min_limit, the radio access network node 12 may choose or set a DRX configuration with adjusted wake period in time domain by e.g.:

Firstly, the radio access network node 12 changes the DRX offset, which means that the battery saving settings are kept, After that, the radio access network node 12 may increase the wake period by changing the onDuration timer. This may be used in high capacity scenarios e.g. when a lot of wireless devices compete for UL grants each wireless device need more UL scheduling opportunities, If the load is above a maximum limit as a final action the radio access network node 12 may disable DRX to get "infinite" scheduling opportunities.

Furthermore, if the min_limit of UL scheduling opportunities for a specific TDD frame configuration cannot be fulfilled by changing DRX offset a combination with increased onDuration time may be used if that means less wake time for the wireless device 10 than just increasing the onDuration. This is an example of action 602 in FIG. 6.

As stated above the embodiments herein may be implemented on an MBMS but then in the DL direction, to first move and/or change the wake period to have sufficient amount of DL scheduling opportunities.

Figure 11:
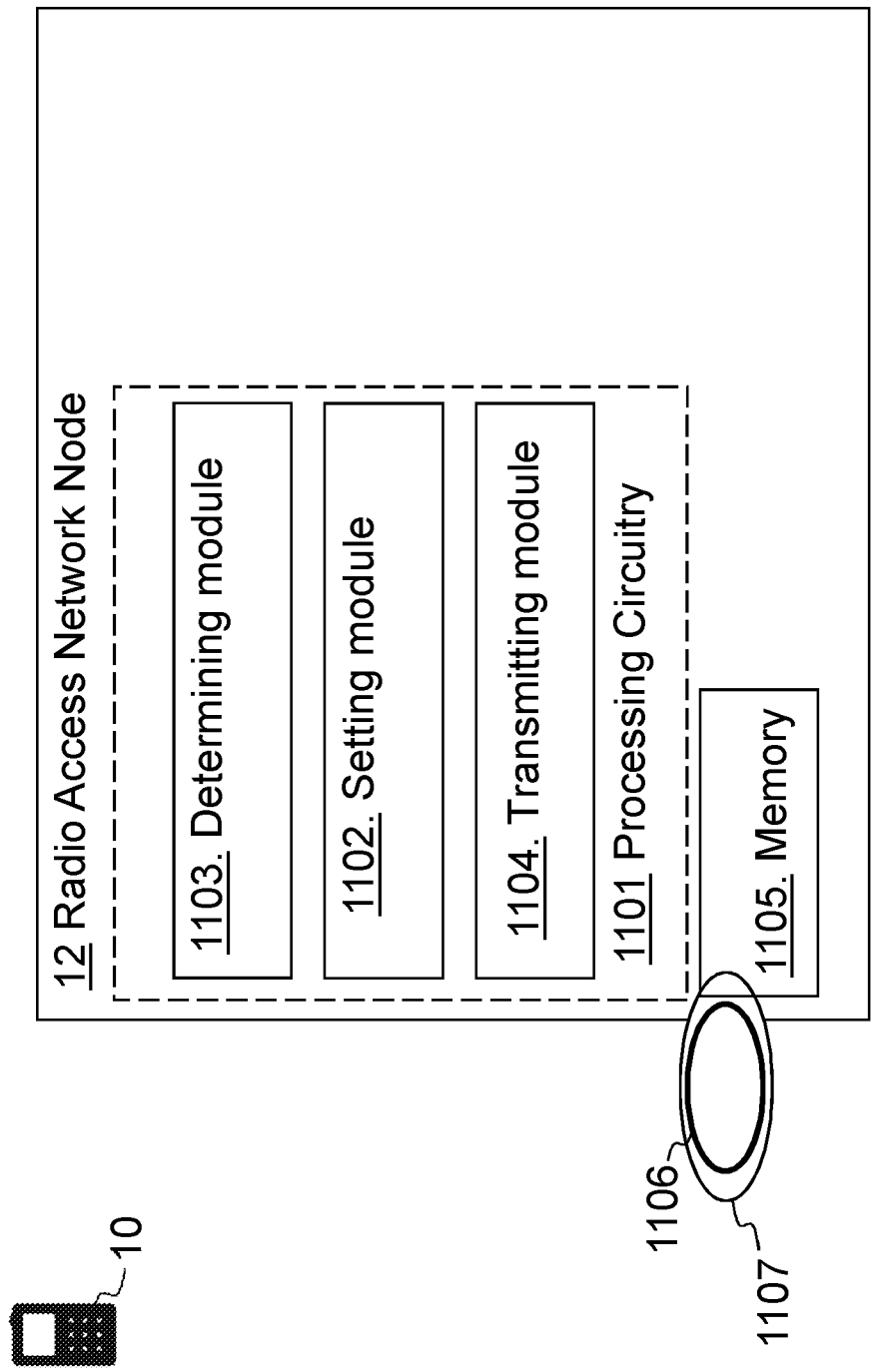
FIG. 11 is a block diagram depicting a radio access network node according to embodiments herein.

FIG. 11 is a block diagram depicting the radio access network node 12 for enabling communication between the wireless device 10 and the radio access network node 12 serving the cell 11 in the wireless communication network 1 according to embodiments herein.

The radio access network node 12 is configured to set the DRX configuration for the wireless device 10 taking an Uplink or Downlink scheduling availability for the wireless device 10 in the cell 11 into account. The set DRX configuration may comprise a wake period for the wireless device 10 configured to overlap a subframe for scheduling uplink or downlink resources for the wireless device 10. The set DRX configuration may comprise a prolonged wake period of the DRX configuration. The downlink scheduling availability may be based on availability of a Multimedia Broadcast Multicast Service. The uplink scheduling availability may be based on an uplink subframe configuration of a Time Division Duplex frame configuration.

The radio access network node 12 may further be configured to offset the DRX configuration adjusted in time for the wake period to overlap the subframe for scheduling uplink or downlink resources for the wireless device 10.

The radio access network node 12 may further be configured to disable the DRX configuration for the wireless device 10 or to set a DRX configuration with a wake period extending over a DRX cycle based on the Uplink or Downlink scheduling availability for the wireless device 10 in the cell 11.

The radio access network node 12 may further be configured to determine number of uplink or downlink scheduling opportunities for the wireless device 10, and configured to set the DRX configuration based on the determined number.

In some embodiments the radio access network node 12 may be configured to offset the DRX configuration adjusted in time for a wake period to overlap a subframe for scheduling uplink or downlink resources for the wireless device 10. Then the radio access network node 12 may further be configured to, based on a load in the cell 11, adjust the wake period, e.g. in length, of the DRX configuration for the wireless device 10, and/or to disable the DRX configuration for the wireless device 10.

The radio access network node 12 may be configured to perform a scheduling request suppression for Voice over Long Term Evolution for the wireless device 10.

The radio access network node 12 may comprise processing circuitry 1101, such as one or more processors.

The radio access network node 12 may further comprise a setting module 1102. The setting module 1102 and/or the processing module 1101 may be configured to set the DRX configuration for the wireless device 10 taking the Uplink or Downlink scheduling availability for the wireless device 10 in the cell 11 into account. The downlink scheduling availability may be based on availability of a Multimedia Broadcast Multicast Service. The uplink scheduling availability may be based on an uplink subframe configuration of a Time Division Duplex frame configuration. The set DRX configuration may comprise a wake period for the wireless device 10 configured to overlap a subframe for scheduling uplink or downlink resources for the wireless device 10. The setting module 1102 and/or the processing module 1101 may be configured to offset the DRX configuration adjusted in time for the wake period to overlap the subframe for scheduling uplink or downlink resources for the wireless device 10. The set DRX configuration may comprise a prolonged wake period of the DRX configuration. The setting module 1102 and/or the processing module 1101 may be configured to disable the DRX configuration for the wireless device 10 or set a DRX configuration with a wake period extending over a DRX cycle based on the Uplink or Downlink scheduling availability for the wireless device 10 in the cell 11. The setting module 1102 and/or the processing module 1101 may be configured to offset the DRX configuration adjusted in time for a wake period to overlap a subframe for scheduling uplink or downlink resources for the wireless device 10, and further be configured to, based on a load in the cell 11, adjust the wake period of the DRX configuration for the wireless device 10, and/or to disable the DRX configuration for the wireless device 10.

The radio access network node 12 may further comprise a determining module 1103. The determining module 1103 and/or the processing circuitry 1101 may be configured to determine number of uplink or downlink scheduling opportunities for the wireless device 10, and be configured to set the DRX configuration based on the determined number.

The radio access network node 12 and/or the processing circuitry 1101 may be configured to perform a scheduling request suppression for Voice over Long Term Evolution for the wireless device 10.

The radio access network node 12 may further comprise a transmitting module 1104. The transmitting module 1104 and/or the processing circuitry 1101 may be configured to transmit the set DRX configuration to the wireless device 10.

Furthermore, the radio access network node 12 comprises a memory 1105. The memory 1105 comprises one or more units to be used to store data on, such as frame configurations, DRX configurations, load in cell, applications to perform the methods disclosed herein when being executed, and similar.

The methods according to the embodiments described herein for the radio access network node 12 may be respectively implemented by means of e.g. a computer program 1106 or a computer program product, comprising instructions, i.e., software code portions, which, when executed on at least one processor, cause the at least one processor to carry out the actions described herein, as performed by the radio access network node 12. The computer program 1106 may be stored on a computer-readable storage medium 1107, e.g. a disc or similar. The computer-readable storage medium 1107, having stored thereon the computer program, may comprise the instructions which, when executed on at least one processor, cause the at least one processor to carry out the actions described herein, as performed by the radio access network node 12. In some embodiments, the computer-readable storage medium may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of radio access network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It will be appreciated that the foregoing description and the accompanying drawings represent non-limiting examples of the methods and radio node taught herein. As such, the radio node and techniques taught herein are not limited by the foregoing description and accompanying drawings. Instead, the embodiments herein are limited only by the following claims and their legal equivalents.

The invention claimed is:

1. A method, performed in a radio access network node serving a cell in a wireless communication network, for enabling communication between a wireless device and the radio access network node; the method comprising:

determining an uplink or downlink scheduling availability for data packets for the wireless device in the cell; and configuring the wireless device to be sufficiently active within an interval to have a transmission opportunity by setting a discontinuous reception (DRX) configuration for the wireless device taking into account the uplink or downlink scheduling availability for the data packets for the wireless device in the cell;
wherein the setting the DRX configuration comprises:
offsetting the DRX configuration adjusted in time so that a wake period overlaps a subframe for scheduling uplink or downlink resources for the data packets for the wireless device; and
thereafter, based on a load in the cell:
adjusting the wake period of the DRX configuration for the wireless device; and/or
disabling the DRX configuration for the wireless device.

2. The method of claim 1, wherein the DRX configuration comprises the wake period for the wireless device overlapping the subframe for scheduling uplink or downlink resources for the data packets for the wireless device.

3. The method of claim 1, wherein the DRX configuration comprises a prolonged wake period of the DRX configuration.

4. The method of claim 1, wherein the setting the DRX configuration comprises setting a DRX configuration with a wake period extending over a DRX cycle.

5. The method of claim 1:
further comprising determining a number of uplink or downlink scheduling opportunities for the data packets for the wireless device;
wherein the setting the DRX configuration comprises setting the DRX configuration based on the determined number.

6. The method claim 1, wherein the downlink scheduling availability for the data packets is based on availability of a Multimedia Broadcast Multicast Service.

7. The method of claim 1, wherein the uplink scheduling availability for the data packets is based on an uplink subframe configuration of a Time Division Duplex frame configuration.

8. The method of claim 1, wherein the radio access network node uses scheduling request suppression for Voice over Long Term Evolution for the wireless device.

9. A radio access network node serving a cell in a wireless communication network, the radio access network node enabling communication between a wireless device and the radio access network node; the radio access network node comprising:
processing circuitry;
memory containing instructions executable by the processing circuitry whereby the processing circuitry is operative to:
determine an uplink or downlink scheduling availability for data packets for the wireless device in the cell; and
configure the wireless device to be sufficiently active within an interval to have a transmission opportunity by setting a discontinuous reception (DRX) configuration for the wireless device taking into account the uplink or downlink scheduling availability for the data packets for the wireless device in the cell;
wherein the instructions are such that the radio access network node is operative to:
offset the DRX configuration adjusted in time for a wake period to overlap a subframe for scheduling uplink or downlink resources for the data packets for the wireless device; and
based on a load in the cell, adjust the wake period of the DRX configuration for the wireless device, and/or to disable the DRX configuration for the wireless device.

10. The radio access network node of claim 9, wherein the DRX configuration comprises the wake period for the wireless device configured to overlap the subframe for scheduling uplink or downlink resources for the data packets for the wireless device.

11. The radio access network node of claim 9, wherein the DRX configuration comprises a prolonged wake period of the DRX configuration.

12. The radio access network node of claim 9, wherein the instructions are such that the radio access network node is operative to set a DRX configuration with a wake period extending over a DRX cycle, based on the Uplink or Downlink scheduling availability for the data packets for the wireless device in the cell.

13. The radio access network node of claim 9, wherein the instructions are such that the radio access network node is operative to:
determine number of uplink or downlink scheduling opportunities for the data packets for the wireless device; and
set the DRX configuration based on the determined number.

14. The radio access network node of claim 9, wherein the downlink scheduling availability for the data packets is based on availability of a Multimedia Broadcast Multicast Service.

15. The radio access network node of claim 9, wherein the uplink scheduling availability for the data packets is based on an uplink subframe configuration of a Time Division Duplex frame configuration.

16. The radio access network node of claim 9, wherein the instructions are such that the radio access network node is operative to perform a scheduling request suppression for Voice over Long Term Evolution for the wireless device.

* * * * *